US012530155B2

(12) United States Patent
Jana

(10) Patent No.: US 12,530,155 B2
(45) Date of Patent: Jan. 20, 2026

(54) METHOD FOR GENERATING FIRMWARE-DEDICATED STORAGE PROTOCOL QUEUES FOR VIRTUAL DEVICES

(71) Applicant: Avago Technologies International Sales Pte. Limited, Singapore (SG)

(72) Inventor: Arun Prakash Jana, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 105 days.

(21) Appl. No.: 18/639,908

(22) Filed: Apr. 18, 2024

(65) Prior Publication Data

US 2025/0328292 A1 Oct. 23, 2025

(51) Int. Cl.
*G06F 3/06* (2006.01)
(52) U.S. Cl.
CPC ............ *G06F 3/0665* (2013.01); *G06F 3/061* (2013.01); *G06F 3/0673* (2013.01)
(58) Field of Classification Search
CPC ....... G06F 3/0665; G06F 3/061; G06F 3/0673
See application file for complete search history.

(56) References Cited

U.S. PATENT DOCUMENTS

| 8,805,918 | B1* | 8/2014 | Chandrasekaran ... | G06F 3/0619 709/200 |
| 2009/0307473 | A1* | 12/2009 | Miller ................... | G06F 9/3824 712/245 |
| 2011/0246677 | A1* | 10/2011 | Johnson ................ | G06F 3/0613 710/10 |
| 2019/0391876 | A1* | 12/2019 | Kundu .................. | G06F 3/0688 |

* cited by examiner

Primary Examiner — Farley Abad
(74) Attorney, Agent, or Firm — Quarles & Brady LLP

(57) ABSTRACT

A method for creating firmware-dedicated queues for storage system multi-queue operation is provided. The method includes providing a controller to manage a plurality of input/output (IO) operations between hosts and virtual disks by issuing the plurality of IO operations to a plurality of queues comprising submission queues and completion queues, wherein one or more submission queues are mapped to each completion queue. The method also includes configuring at least one submission queue as a FW-dedicated queue for submitting internal IO operations initiated by firmware (FW) associated with the controller. The method further includes adding one or more parameters in FW-queue-related fields in a controller device state table for each device of the virtual disks. The one or more parameters include at least a first parameter to enable the FW-dedicated queue for only submitting the internal IO operations in parallel with other queues to the device.

20 Claims, 5 Drawing Sheets

| Field | Description |
| --- | --- |
| FwQueueEnable | A bit to indicate that the dedicated FW Queue is enabled |
| FwQueueConfigured | A bit to indicate that the dedicated FW Queue is configured |
| FwIssuedIOCount | Total number of outstanding FW-issued IOs |
| FwHeadPendPtr | Pointer to the head LMID in the FW IO Pend List |
| FwTailPendPtr | Pointer to the tail LMID in the FW IO Pend List |
| FwQueueDepth | Queue Depth of the FW Submission queue |
| FwPendingIOCount | Count of Pending FW IOs for the device |

FIG. 1

| 7 | 6 | 5 | 4 | 3 | 2 | 1 | 0 |
|---|---|---|---|---|---|---|---|
| Reserved | | FW Trap Enable | FwIO | Return to FW | Reserved | Error Completion | Complete to FW |

FIG. 2

METHOD FOR GENERATING FIRMWARE-DEDICATED STORAGE PROTOCOL QUEUES FOR VIRTUAL DEVICES

FIELD OF INVENTION

The subject technology is directed to methods of managing system input/output (IOs) operations submitted to virtual disks.

BACKGROUND OF THE INVENTION

Next generation microservice-based computation and storage applications will be architected in a way so that each microservice has its own dynamically allocated compute resources. For example, the non-volatile memory express (NVMe) multiqueue model will allow these compute resources to be paired with their own queues to the NVMe storage devices. This pairing reduces central processing unit (CPU) locking, wait times, and the cycles needed to process input/output (IO) traffic to and from storage devices. By accessing more queues and deeper queue depths, NVMe storage devices can process and complete more IO requests from the compute infrastructure, resulting in higher performance, lower latencies, and more scalability.

For a redundant array of independent disks (RAID) storage system, there are several scenarios where a RAID controller generates high number of internal IO operations submitted to each device in virtual disks (VDs) for long durations. VD represents multiple devices exposed as a single volume per user (host) requirement for achieving data redundancy and fault tolerance under the RAID system. These internal IO operations generated by RAID controller are typically processed in parallel to host IO operations, affecting the controller performance. On the device side, internal IO operations share the same queues as host IO operations across all device types, further affecting performance. Although NVMe devices are designed to support multiple queues to enable parallel processing and lower latency, the existing hardware does not leverage this capability during firmware operations that generate a high volume of IO activities. Therefore, improved method for managing the internal IO operations during high volume of IO activities to improve system performance is desired.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 1 is a table listing various queue parameters being added to firmware queue related fields in a RAID manager device state table for each device according to an embodiment of the subject technology.

FIG. 2 is a message flag in a local message index frame of an input/output (IO) request issued from the controller for a device according to an embodiment of the subject technology.

DETAILED DESCRIPTION OF THE INVENTION

Figure 3:
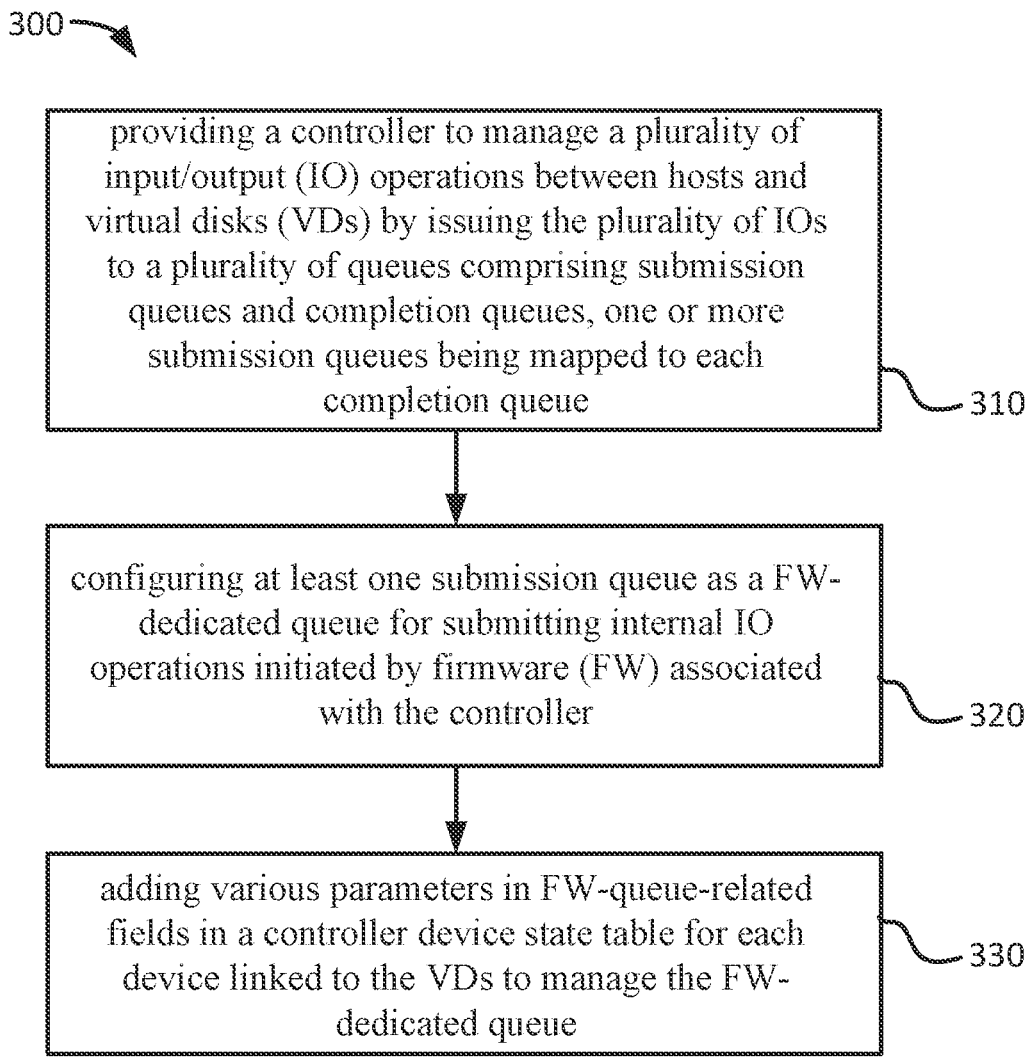
FIG. 3 is a flow chart illustrating a method for creating firmware-dedicated queues for storage system multi-queue operation according to an embodiment of the subject technology.

The present disclosure provides methods of managing storage system input/output (IOs) operations submitted to virtual disks. In an embodiment, the method includes mapping a plurality of queues from a controller to virtual disks with n (n≥1) submission queues per each completion queue, configuring at least one submission queue as a firmware-dedicated queue, and adding one or more parameters for characterizing the firmware-dedicated queue in a controller device state table for each device of virtual disks, the one or more parameters including at least a first parameter to indicate the firmware-dedicated queue been enabled to submit firmware-generated input/output operations. There are additional embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Similarly, when an element is referred to herein as being "bonded" to another element, it is to be understood that the elements can be directly bonded to the other element (without any intervening elements) or have intervening elements present between the bonded elements. In contrast, when an element is referred to as being "directly bonded" to another element, it should be understood that no intervening elements are present in the "direct" bond between the elements. However, the existence of direct bonding does not exclude other forms of bonding, in which intervening elements may be present.

Likewise, when an element is referred to herein as being a "layer," it is to be understood that the layer can be a single layer or include multiple layers. For example, a conductive layer may comprise multiple different conductive materials or multiple layers of different conductive materials, and a dielectric layer may comprise multiple dielectric materials or multiple layers of dielectric materials. When a layer is described as being coupled or connected to another layer, it is to be understood that the coupled or connected layers may include intervening elements present between the coupled or connected layers. In contrast, when a layer is referred to as being "directly" connected or coupled to another layer, it should be understood that no intervening elements are present between the layers. However, the existence of directly coupled or connected layers does not exclude other connections in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

NVM Express (NVMe) is a register level interface that allows host software to communicate with a nonvolatile memory subsystem including multiple virtual disks. The interface provides optimized command submission and completion paths. A Queue is a fundamental data structure used throughout computing to manage and organize data in a sequential manner, adhering to a first-in, first-out (FIFO) principle. This means that the first element added to the queue will be the first one to be removed, much like a line of people waiting for service where the first person in line is the first to be served. Queues are versatile and find applications in various areas of computer science and information technology, from managing tasks in operating systems to handling data packets in networking. NVMe interface includes support for parallel operation by supporting up to 65,535 input/output (IO) Queues with up to 64K outstanding commands per IO Queue. NVMe interface is based on a paired Submission and Completion Queue mechanism. Commands are placed by host software in directly attached drive or by storage controller (which converts the IOs into backend IOs to be issued) into a Submission Queue submitted to corresponding devices to execute. Completions are placed into the associated or dedicated Completion Queue by the controller to indicate the tasks finished. Multiple Submission Queues may utilize the same Completion Queue in n:1 mapping.

The NVMe multi-queue interface uses a paired queue mechanism to pass messages that consist to NVMe commands (IO, admin and fabric) and command completion notifications between the host memory and the controller. These commands and completion notifications are called queue entries (QEs). Queues are placed into pairs that consist of one or more submission queues (SQ) and one completion queue (CQ). The host places Submission Queue Entries (SQE) to the controller into the SQs. The controller places Completion Queue Entries (CQE) from the controller back to the host into the associated CQ. When using a memory-based transport such as high-speed interface like peripheral component interconnect express (PCIe) for connecting various hardware components inside the computer, multiple SQs can use the same CQ.

If an NVMe queue pair processes admin and fabric commands, it is an Admin Queue Pair (or admin queue). If the queue pair processes IO commands, it is an IO Queue Pair (or IO queue). Each controller has one admin queue that can have a maximum queue depth of 4000 entries. Admin and discovery controllers contain only admin queues, while the IO controllers can contain a single admin queue and a maximum of 65535 IO queues. The IO queues can have a maximum queue depth of 65535 thousand entries. While NVMe interface supports up to 65535 queues with queue depth support for up to 65535 commands per queue, no existing NVMe controller supports that many queues and that level of queue depth. Most existing NVMe controllers support a far smaller number of queues with the normal range being from four to 256 queues—with queue depths ranging from 32 to 2048.

Alternatively, the NVMe interface can be considered a NVMe manager assigned to manage the IO operations issued from the host as well as firmware (FW) of the controller and submitted to each device of VDs under NVMe protocol. In this embodiment, the NVMe manager can be considered a HW unit responsible for processing the Submission and Completion of NVMe commands for all NVMe devices. The HW converts the commands to NVMe commands, submits them to each NVMe device and handles the completions of executing these commands.

The RAID controller uses firmware (FW) to initiate several FW background operations like rebuild (initiated to reconstruct the data that was on the failed drive onto a new drive in the RAID array), copyback (issued to move data from one physical drive to another after a drive has been temporarily replace or during load balancing activity), check-consistency (issued to verify the integrity of the data and parity in RAID array), patrol-read (a preventative operation where the firmware scans the drives in the array for potential error or bad sectors), etc. These FW background operations generate FW-issued IO requests to devices in virtual disks. Virtual disks (VDs) in storage systems represent an abstraction layer over physical storage hardware, allowing for more flexible, efficient, and sophisticated management of storage resources. VDs are a combination of one or more devices (drives or disks) exposed to the host as a single volume. VDs enable the decoupling of storage services and capabilities from the underlying hardware, providing a way to aggregate, partition, replicate, and dynamically manage storage resources. Throughout the specification, devices or drives or disks (or NVMe devices under NVMe protocol) within each VD are generally referred to as devices. These FW-issued IO (or simply referred to FW IO) requests will utilize the same NVMe queue to be submitted to each device in the VD as IO operations initiated by the host. Consequently, the performance of host IO operations is significantly affected due to the concurrent execution of multiple background FW IO operations. Host IO operations may be random or sequential but in general the IO operations generated by FW are sequential. This indicates that a dedicated queue for FW IO operations works more effectively.

Certain types of IO operations are not handled by hardware (HW), e.g., NVMe Physical Region Page (PRP) unaligned IOs involve data transfers not aligned with the natural boundaries of physical region pages (multiples of the hardware's page size, e.g., 4 KB) with the NVMe protocol framework. The NVMe standard uses PRPs to describe memory locations for data transfers between the host and an NVMe device. In these cases, FW has to issue them as aligned child IOs to the drive. Since all unaligned host IOs are diverted to FW, the latency is higher compared to aligned IOs which take the HW-accelerated path. Using the same queue as the host IOs increase the completion time of these IOs.

The present disclosure provides a technology for improving host IO performance by introducing firmware-dedicated queues for submitting FW IO operations to the devices. The firmware (FW)-dedicated queue works more effectively for the sequential FW IO operations and can take the unaligned IOs out of the queues to give more compute resources for the host IO operations. Even for some NVMe drives, the queue depth can be as low as 32, the dedicated queues for FW IOs reduces the loads that demand to share queues with host IOs and increase possible number of IOs that can be issued in parallel to these NVMe drives.

One general aspect of the subject technology includes a method for creating firmware-dedicated queues for storage system multi-queue operation. The method also includes providing a controller to manage a plurality of input/output (IO) operations between hosts and a virtual disk (VD) by issuing the plurality of IO operations to a plurality of queues comprising submission queues and completion queues, wherein one or more submission queues are mapped to each completion queue. The method also includes configuring at least one submission queue as a FW-dedicated queue for submitting internal IO operations initiated by firmware (FW) associated with the controller and one completion queue shared with other IO operations. The method also includes adding one or more parameters in FW-queue-related fields in a controller device state table for each device in the VD, where the one or more parameters include at least a first parameter to enable the FW-dedicated queue for submitting the internal IO operations in parallel with other queues to the device.

Implementations of this method may include one or more of the following features. The method may include toggling the first parameter of from 0 to 1 to enable the FW-dedicated queues at runtime and using the FW-dedicated queues for submitting internal IO operations issued by the firmware only when a large number of IO operations are issued. The configuring may include, if the first parameter is set to 1, configuring the submission queues and completion queues by the firmware during discovery of each device in the VD. The configuring may include configuring the FW-dedicated queues by the firmware irrespective of the first parameter being toggled to 0 or 1 and setting a second parameter to 1 in the controller device state table to indicate the FW-dedicated queue being configured. The method may include using the FW-dedicated queues by the storage system controller for any IO operations when the first parameter is set to 0 to indicate that the FW-dedicated queues are unused by the firmware. The method may include identifying an IO operation to be a host IO operation or a firmware IO operation by an interface of the controller based on a message flag bit in a local message index (LMID) frame of the IO operation. The interface may include a queue manager using non-volatile memory express (NVMe) protocol. The method may include, when the first parameter is set to 1 for a device in the VD supporting the NVMe protocol, using the FW-dedicated queue to submit the firmware IO operation to the device, the FW-dedicated queue being serviced in parallel to other submission queues configured for the same device. The method may include adding a user-configurable flag to a non-volatile memory associated with the controller to let user enable or disable the FW-dedicated queue from host applications or from third-party utilities using application programming interfaces. The method may include, once the user-configurable flag is set to enable the FW-dedicated queue, configuring the FW-dedicated queue as a submission queue and configuring a completion queue either as a dedicated queue or shared queue for a device in the VD supporting NVMe protocol during discovery phase of the device, and setting the first parameter to 1 in the controller device state table for the device supporting NVMe protocol. The adding one or more parameters in FW-queue-related fields may include adding a third parameter to indicate a total number of outstanding firmware IO operations being issued, a fourth parameter to indicate a location of a first element in local message index in a list of pending firmware IO operations to be processed, a fifth parameter to indicate a location of a last entry in local message index in a list of pending firmware IO operations to be processed, a sixth parameter to indicate a queue depth of the FW-dedicated queue used as a submission queue, and a seventh parameter to indicate a total number of pending firmware IO operations to be processed.

Another general aspect of the subject technology includes a method for managing firmware-issued input/output (IO) operations via firmware-dedicated queues. The method also includes processing a firmware-issued IO operation submitted via a firmware-dedicated submission queue. The method also includes placing a result of processing the firmware-issued IO operation to a completion queue. The method also includes changing a parameter of FwIssuedIOCount in a device state table by a decrement of 1 to indicate that a total number of outstanding firmware-issued IO operations is one less. The method also includes identifying the parameter of FwIssuedIOCount to be smaller than a parameter of FwQueueDepth to indicate that a total number of the firmware-issued IO operations in the firmware-dedicated queue is smaller than a depth of the firmware-dedicated queue. The method also includes identifying a parameter of FwPendingIOCount to be greater than 0 to indicate that at least one of firmware-issued IO operations is in a list of pending IO operations to be submitted. The method also includes reducing the parameter of FwPendingIOCount by 1. The method also includes increasing the parameter of FwIssuedIOCount by 1 by issuing a new IO operation by the firmware to utilize the depth of the firmware-dedicated queue. The method also includes issuing a parameter of FwHeadPendPtr to indicate a new location of a first element in a local message index in a list of pending IO operations and adjusting a parameter of FwTailPendPtr to indicate a location of last entry in the local message index in the list of pending IO operations after a first firmware-issued IO in the list of pending IO operations is submitted to the firmware-dedicated queue.

Implementations of the method may include one or more of the following features. The method may include configuring at least one submission queue as a firmware-dedicated queue for the firmware-issued IO operation and changing a parameter of FwQueueConfigured from 0 to 1 in the device state table. The method may include enabling the firmware-dedicated queue for processing only firmware-issued IO operations and setting a parameter of FwQueueEnable to 1. If the parameter of FwPendingIOCount is 0, setting the parameter of FwQueueEnable to 0 to indicate that the firmware-dedicated queue is not used, and sharing the firmware-dedicated queue with host IO operations.

Yet another general aspect of the subject technology includes a method for managing system input/output (IO) operations for a virtual disk via firmware-dedicated queues. The method also includes receiving an IO operation by a controller. The method also includes checking whether a control bit FwIO is set to 0 or 1 in a local message index (LMID) frame of the IO operation and whether a parameter of FwQueueEnable is set to 0 or 1 in a device state table of the controller for each device linked to the virtual disk. The method also includes if at least one of FwIO and FwQueueEnable equals to 0, submitting the IO operation as a host IO operation. The method also includes else, if both FwIO and FwQueueEnable equal to 1 to indicate that the IO operation is a firmware IO and a submission queue is enabled to be a firmware-dedicated queue, checking whether a parameter of FwPendingIOCount is greater than 0 or not in the device state table of the controller indicating a total number of a list of pending IO operations to be submitted to the firmware-dedicated queue; if the parameter of FwPendingIOCount is greater than 0, increasing the parameter of FwPendingIOCount by 1; and appending the IO operation to the list of pending IO operations; else, if FwPendingIOCount is queue equals to 0, identifying that a parameter of FwIssuedIOCount representing a total number of outstanding IO operations issued by the firmware is smaller than a parameter of FwQueueDepth representing a depth of the firmware-dedicated queue; increasing the parameter of FwIssuedIOCount by 1; and issuing the IO operation by the firmware to the firmware-dedicated queue.

Implementations of this method may include one or more of the following features. The method may include, if the parameter of FwIssuedIOCount is equal to or greater than the parameter of FwQueueDepth, increasing the parameter of FwPendingIOCount by 1 and appending the IO operation to the list of pending IO operations. The method may include, after increasing the parameter of FwPendingIOCount by 1, adjusting a parameter of FwHeadPendPtr to indicate an updated location of a first element in the local message index in the list of pending IO operations and adjusting a parameter of FwTailPendPtr to indicate an updated last entry in the local message index in the list of pending IO operations. The controller may include a redundant array of independent disks (RAID) manager with firmware and hardware support for non-volatile memory express (NVMe) protocol, adding a user-configurable flag in a non-volatile memory of the controller to let user from host applications to enable the firmware-dedicated queue, configuring the firmware-dedicated queue as a dedicated submission queue, and setting the FwQueueEnable to 1 in the device state table for each NVMe device linked to the virtual disk supporting the NVMe protocol. The method may include, the controller may include a NVMe manager as an interface to each NVMe device linked to the virtual disk, configuring and using the firmware-dedicated queue by the NVMe manager to submit the list of firmware IO operations pending to the firmware-dedicated queue if the FwQueueEnable is set to 1, and sharing the firmware-dedicated queue by the NVMe manager for all IO operations if the FwQueueEnable is set to 0.

The FW-dedicated queue (or simply FW queue) can be initiated by the controller (or its firmware, RFID manager) with certain specific parameters defining the characteristics of the FW queue to be added into fields in a device state table for each device (e.g., NVMe drive) in a virtual disk (supporting NVMe protocol). FIG. 1 is a table listing various queue parameters being added to the FW queue related fields in a RAID manager device state table for each device according to an embodiment of the subject technology. FW queue is a data structure used by the device's firmware and embedded in the hardware (HW) register mapping in a solution where the RAID manager is a HW component to manage tasks or commands that are to be executed by each device. As shown, a first parameter is denoted as "FwQueueEnable", which represents a bit to indicate that the FW-dedicated queue is enabled. It means that the queue's operational state is active, allowing it to accept and manage tasks or commands specifically issued by the controller firmware. Enabling a queue is typically a binary state—it's either on (value 1) or off (value 0). A second parameter is denoted as "FwQueueConfigured", which represents a bit to indicate that the FW-dedicated queue is configured. FW queue is configured refers to the process or state where the queue's parameters, behavior, and functionalities are defined and set up. Configuration can include specifying the size of the queue, setting priority rules for how tasks are managed, defining how tasks are to be handled under different conditions, and other operational settings. Configuration is a prerequisite for enabling the queue but is more detailed, involving the setup of how the queue will operate when it is enabled. Configuring involves detailed settings that define the queue's behavior and parameters. Typically, a queue must first be configured before it is enabled. Configuration sets the groundwork for how the queue will function, and enabling it puts those configurations into effect.

Depending on the controller type for the NVMe device, the submission and completion queues may be mapped 1:1 or n:1. The 1:1 mapping is a configuration that each submission queue is paired with one unique (or dedicated) completion queue. It's direct mapping where each set of operations has its dedicated path for submission and completion notifications, optimizing performance and reducing potential bottlenecks. In n:1 mapping, multiple submission queues might exist for different purposes (like one specifically dedicated to firmware (FW) operations), but they must share a single completion queue. If only n:1 is possible, at least one submission queue for FW will be dedicated but the completion queue will be configured to be shared with host IOs. In other words, at least one submission queue will be created and dedicated for submitting firmware IO operations. But the completion queue will be shared by the FW IO and host IOs. This configuration implies a compromise to ensure that firmware operations (which might include maintenance tasks, updates, or internal management commands critical for the device's operation) have a dedicated pathway for submission, minimizing the impact on their initiation. However, the results of these operations will be reported back through a shared completion queue, potentially alongside the completion notifications for regular host IO operations.

If the feature with a FW-dedicated queue is activated, e.g., with FwQueueEnable=1, the firmware (FW) will set up the submission and completion queues during device discovery. The device discovery is an initial phase where the system's firmware detects new devices that have been connected to the system. During the device discovery phase, the system identifies the connected devices and their capabilities. As part of this process, the firmware and drivers are loaded, and initial configurations are made to ensure that the device and the host can communicate effectively. The device discovery phase includes device identifications, firmware initialization, and queue configuration. By setting up separate queues for submission and completion, NVMe manager leverages parallel processing capabilities, allowing multiple IO operations to be handled simultaneously. Regardless of whether this feature is active, the firmware has the discretion to establish dedicated queues and mark the FwQueueConfigured=1 in the device state table. Alternatively, the firmware may adjust FwQueueEnable dynamically, utilizing these queues exclusively when bulk (a large number of) IO operations are issued. When the feature is not in use (e.g., FwQueueEnable=0), the hardware (HW) has the option to employ these queues for any IO operations, potentially enhancing performance through better IO load distribution.

FIG. 1 also shows some other parameters for characterizing the FW-dedicated queue added into the device state table for the device to handle IO operations issued by the firmware only. These parameters in the FW-queue-related fields include a third parameter, denoted as FwIssuedIOCount, to indicate total number of outstanding IO operations issued by the firmware to the device for handling many background operations like rebuild, copyback, check-consistency, patrol-read, etc. These IO operations issued by the firmware have been started in process in the device but not yet completed. FwIssuedIOCount serves for assessing system performance. A high FwIssuedIOCount indicates that the device is actively working on a large number of IO operations issued by the firmware, which could suggest good utilization but might also highlight performance issues if these operations are not completing in a timely manner.

Shown in the table in FIG. 1, a fourth parameter, denoted as FwHeadPendPtr, is added to indicate a location of a first element in local message index (LMID) in a list of pending firmware IO operations to be issued by the FW-dedicated queue for the device to process. This list of pending firmware IO operations refers to a list of IOs (Commands or Admins) maintained by the firmware that tracks IO requests awaiting to be issued (submitted) by the FW-dedicated queue in a sequential manner. This parameter serves for ensuring that all IO requests are accounted for and processed in an orderly and efficient manner. With the parameter, the firmware can quickly and efficiently locate the start of the list. From there, the firmware can access the first IO operation's details and proceed with processing or scheduling the operation, as well as navigate through the rest of the list if necessary. Further, a fifth parameter, denoted as FwTailPendPtr, is added to indicate a location of a last entry in local message index in a list of pending firmware IO operations. The parameter refers to where new elements of the last IO request added in a queue or a similar linear structure that follows a First In, First Out (FIFO) principle. Each entry in this list is associated with a local message index (LMID) which uniquely identifies the IO operation. By knowing the location of the last entry, the firmware may be able to append new IO operations to the end of the pending list without needing to traverse the entire list.

Furthermore, a sixth parameter, denoted as FwQueueDepth, is added in the device state table to indicate queue depth of the FW-dedicated queue configured and used as a submission queue. The queue depth refers to the maximum number of IO operations or commands that the queue can hold at any given time before it becomes full. It provides capacity management of the queue. A deeper queue can accommodate more IO requests, which is beneficial under heavy load conditions, allowing the system to continue accepting I/O operations without immediate being issued to the device. However, if the queue is too deep relative to the system's processing capacity, it may lead to increased latency as requests take longer to be processed. It also manages system performance optimization. The queue depth for the FW-dedicated queue is set based on the expected workload and the need to isolate or prioritize these FW IO operations from regular host IO activity. This number may often be compared with the parameter of FwIssuedIOCount (i.e., the number of FW IOs in the queue) and determine if the FW-dedicated submission queue's capacity is not fully utilized, allowing new IO request to be issued and appended to the list if necessary.

Further, a seventh parameter, denoted as FwPendingIO-Count, is added to the device state table to indicate a total number of the list of pending FW IO operations to be issued to the device for processing. This number, FwPendingIO-Count, may be updated by an increment of 1 if the number of issued FW IOs, FwIssuedIOCount, equals to the queue depth of the FW-dedicated submission queue, FwQueueDepth, meaning that a new IO operation has to be added to the list of pending IOs. Alternatively, if FwIssuedIOCount is found to be smaller than FwQueueDepth, the parameter, FwIssuedIOCount, can be updated by an increment of 1, allowing a new FW IO operation if necessary to be issued in the FW-dedicated queue to the device. Once a FW IO operation is picked up for processing by the device, it is not in any queue anymore. When the device is done processing the IO, it will place it in the common OR FW dedicated completion queue. RAID Manger will see the completion, remove the IO from the completion queue, and if FwIO bit is set in the LMID, decrement FwIssuedIOCount by 1. RAID Manager (as a hardware unit) will then send a message to the firmware indicating that the LMID has been processed.

Both logical drive level or device level message frames of various kinds of IO operations contain a message flag field, which includes various flags to indicate specific attributes or behaviors for the IO operations. The message flag field has a specific flag denoted as "FwIO", as shown in FIG. 2. The "FwIO" flag is a bit (in a message flag byte) to indicate whether an IO operation is a host IO or a FW IO. When FW issues an IO, it will set the FwIO flag in the LMID frame. All the Child IO's LMIDs inherit this bit but normally no specific action is taken by the NVMe manager based on this bit. In the subject technology, if the parameter of FwQueueEnable is set to 1 (e.g., feature enabled) for an NVMe device, the FwIO bit will be checked by the NVMe Manager to identify that an IO is issued by FW, and it will pick the FW-dedicated Submission Queue to submit the IO to the NVMe device.

FIG. 3 shows a flow chart illustrating a method 300 for creating firmware-dedicated queues for storage system multi-queue operation according to an embodiment of the subject technology. In an embodiment, method 300 includes a step 310 of providing a controller to manage a plurality of input/output (IO) operations between hosts and virtual disks (VDs) by issuing the plurality of input/output (IO) operations to a plurality of queues. The plurality of queues comprises submission queues and completion queues, where one or more submission queues are mapped to each completion queue. This controller applies to any advanced compute or storage system implementing microservice-based applications with capability of dynamically allocating compute resources using multi-queue operations. Using RAID system with NVMe multi-queue model as an example, it allows these compute resources to be paired with their own queues to the storage devices linked to the VDs under NVMe protocol. In the embodiment, the RAID controller is configured, via firmware therein, to mapping the plurality of queues, including both queues initiated by host and by the firmware, to one or more submission queues corresponding to each completion queue provided to each device linked to the VDs.

In the embodiment, method 300 also includes a step 320 for configuring at least one submission queue as a firmware (FW)-dedicated queue for submitting internal IO operations initiated by the firmware and one completion queue shared with other (host-initiated) IO operations. Modern NVMe devices often support a large number of queues (up to 65536 each for submission and completion queues), enabling flexible configurations that can be optimized for different use cases and system architectures. The feature of creating at least one FW-dedicated queue allows the controller to properly utilizing resources while ensuring the internal IO operations to be handled efficiently to reduce latency and improve system performance, especially when a large number of IO operations are initiated either by host or internally by the firmware (e.g., in a storage system including virtual disks which create many maintenances overhead in firmware). Optionally, when there are no firmware-initiated internal IOs, the FW-dedicated queue can be flexibly reallocated by the controller (firmware) to be shared with other host-initiated IO operations.

In the embodiment, method 300 also includes a step 330 of adding one or more parameters in FW-queue-related fields in a controller device state table for each device linked to the VDs. The one or more parameters include at least a first parameter to enable the FW-dedicated queue for submitting the internal IO operations in parallel with other queues. As shown in FIG. 1, the first parameter, FwQueueEnable, is to indicate that the FW-dedicated queue is activated to an operational state as a submission queue, allowing it to accept and manage tasks or commands issued by the firmware (only) and submit them to the corresponding device. Additionally, a second parameter, FwQueueConfigured, can be added to (set) the controller device state table to indicate that the FW-dedicated queue is provided as a submission queue with specified size, priority rules for how tasks are managed, and settings for defining how tasks are to be handled under different conditions for the corresponding device. Furthermore, step 330 includes adding a third parameter, FwIssuedIOCount, to indicate total number of outstanding IO operations issued to the FW-dedicated queue in process by the device; a fourth parameter, FwHeadPendPtr, to indicate a location of a first element in local message index (LMID) in a list of pending firmware IO operations to be issued; a fifth parameter, FwTailPendPtr, to indicate a location of a last entry in local message index in a list of pending firmware IO operations to be issued to the FW-dedicated queue; a sixth parameter, FwQueueDepth, to indicate queue depth of the FW-dedicated queue used as a submission queue; and a seventh parameter, FwPendingIO-Count, to indicate a total number of the list of pending IO operations to be issued to the FW-dedicated queue.

In some embodiments, method 300 also may include toggling the first parameter of from 0 to 1 to enable the FW-dedicated queues at runtime and using the FW-dedicated queues for submitting internal IO operations issued by the firmware only when many IO operations are issued. The firmware of the controller is configured to execute the enabling of the firmware dedicated queue dynamically, depending on the nature of outstanding IO operations to be handled. When large volume of IO operations is initiated or sent out collectively or in large batches, the FW-dedicated queue(s) created by the firmware under the subject technology can significantly reduce overhead and increase efficiency by minimizing the number of separate commands submitted to the submission queues. If the first parameter FwQueueEnable is set to 1, which means that the FW-dedicated queue is activated and ready for submitting FW IO operations to a device linked to the VD, configuring the submission queues and completion queues with additionally specification in details can be done by the firmware during discovery phase of the device. Alternatively, configuring the FW-dedicated queue can be done by the firmware irrespective the first parameter being toggled to 0 or 1. Once the FW-dedicated queue is configured, the firmware can set a second parameter of FwQueueConfigured to 1 in the controller device state table to indicate that the FW-dedicated queue has been configured.

In some embodiments, method 300 may also include identifying an IO operation to be a host IO operation or a firmware IO operation by an interface or a hardware manager unit of the controller based on a message flag bit in a local message index (LMID) frame of the IO operation. This is to activate a bit "FwIO" in a message flag existed in the LMID frame. The interface or hardware manager unit involving the identification is, for example, a queue manager using non-volatile memory express (NVMe) protocol. Optionally, the controller (e.g., a RAID controller) can be configured to have firmware and hardware support for NVMe protocol enabling them to directly interface with NVMe devices, e.g., solid-state drives (SSDs). Optionally, the controller is implemented at a higher layer, e.g., in a host software to initiate the IO requests, the queue manager can be a separate hardware unit responsible for the queue management of the NVMe devices.

In some embodiments, method 300 may also include using the FW-dedicated queue as a submission queue to issue the firmware IO operation to the NVMe device when the first parameter is set to 1 in the controller device state table for the device, the FW-dedicated queue being serviced in parallel to other host queues. Several firmware background operations like rebuild, copyback, check-consistency, patrol-read etc. issue firmware-generated IOs to the device. With the FW-dedicated queue being enabled and configured as a submission queue, the FW-dedicated queue is directly used to submit these firmware-generated IOs to the device in parallel to other (non-dedicated) queues issued for the regular host IOs. Since the IOs initiated by firmware in general are sequential, the FW-dedicated queue works more effectively for submitting these background operations.

In some embodiments, method 300 may also include adding a user-configurable flag to a non-volatile memory associated with the controller to let users enable or disable the FW-dedicated queue from host applications or from third-party utilities using application program interfaces. Since the controller can be implemented via a higher layer host software to initiate the IO requests, the enabling or disabling the function of FW-dedicated queue can be achieved directly by a user based on a modifiable flag stored in a non-volatile memory from the host applications or from third-party utilities using application programming interfaces.

In some embodiments, method 300 may also include, once the user-configurable flag is set to enable the FW-dedicated queue, configuring the FW-dedicated queue as a submission queue and configuring a completion queue either as a dedicated queue or shared queue for a device supporting NVMe protocol during discovery phase of the device, and setting the first parameter, FwQueueEnable, to 1 in the controller device state table for the device supporting NVMe protocol.

Figure 4:
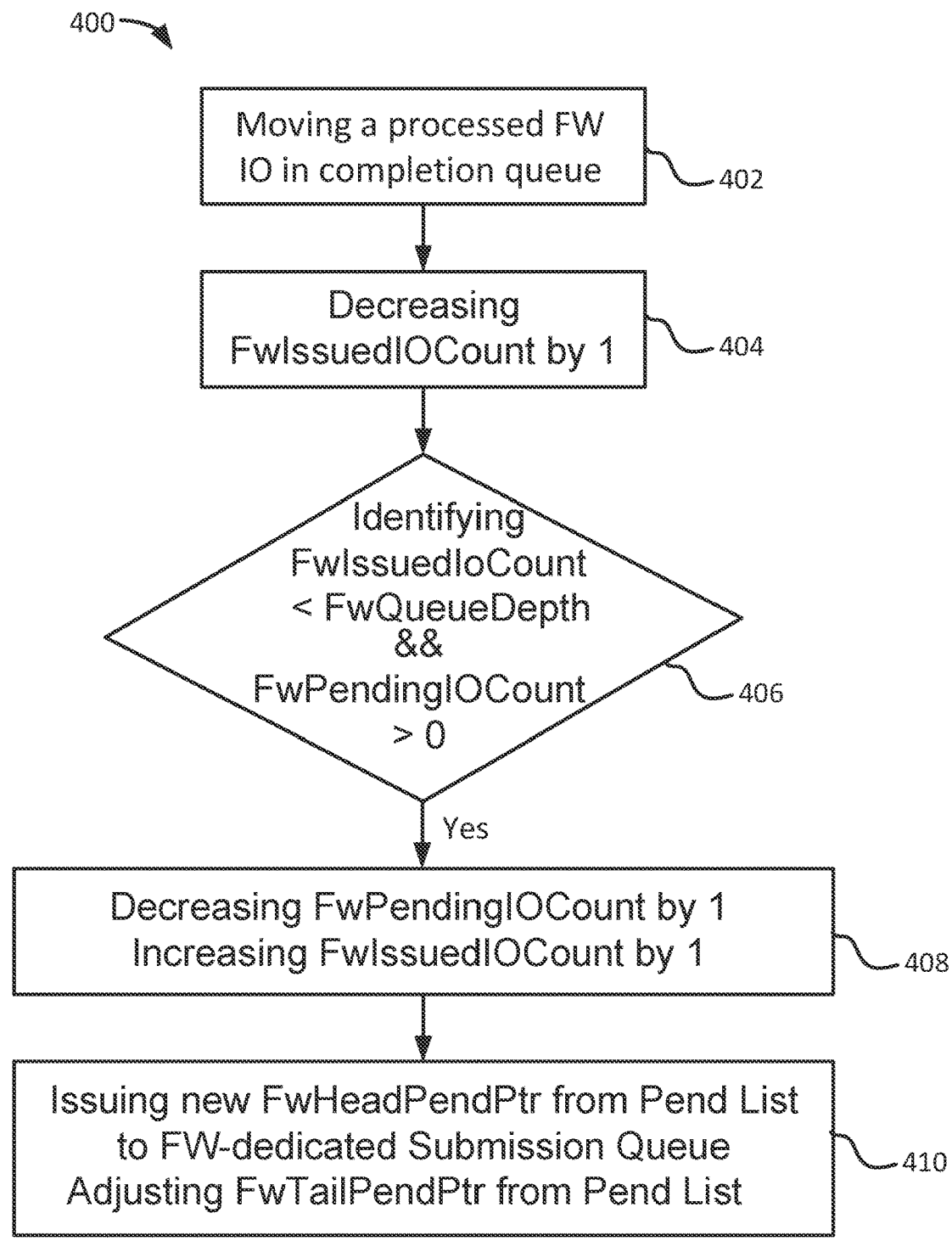
FIG. 4 is a flow chart illustrating a method for managing firmware-issued input/output (IO) operations via firmware-dedicated queues according to an embodiment of the subject technology.

FIG. 4 is a flow chart illustrating a method for managing firmware-issued input/output (IO) operations via firmware-dedicated queues according to an embodiment of the subject technology. In an embodiment, method 400 is provided for a controller where at least one firmware-issued IO operations are in process under a FW-dedicated queue that is enabled and configured as a submission queue (e.g., according to method 300). Method 400 includes a step 402 for moving a processed FW-issued IO operation into a completion queue. This FW-issued IO operation has been finished its requested process by the device. The completion queue may be shared with other IO operations including both FW IOs and host IOs. Method 400 also includes a step 404 for decreasing a parameter FwIssuedIOCount by 1 in the controller device state table for corresponding device (e.g., NVMe device). This step is to update the device state table to indicate the current number of FW IOs issued in the FW-dedicated queue after one FW IO is moved out to the completion queue after processing.

FIG. 4 then shows that method 400 includes step 406 for identifying the parameter of FwIssuedIOCount to be smaller than another parameter of FwQueueDepth to indicate that the total number of the firmware-issued IO operations in the firmware-dedicated queue is smaller than a depth of the firmware-dedicated queue. This step is to indicate that the capacity of the firmware-dedicated queue is still over the current IOs issued by the firmware. The step 406 at the same time also includes identifying a parameter of FwPendingIO-Count in the controller device state stable to be greater than 0 to indicate that at least one of firmware-initiated IO operations is in a list of pending IO operations to be submitted into the firmware-dedicated queue. If either of the above two conditions in step 406 is not satisfied, the controller (firmware) will do nothing, i.e., no action is taken by the controller.

Referring to FIG. 4, if both conditions in step 404 are true, method 400 further includes step 408 for reducing the parameter of FwPendingIOCount by 1 and increasing the parameter of FwIssuedIOCount by 1 by issuing a new IO operation into the firmware-dedicated queue (which has been configured as a submission queue) to utilize the available depth. The controller will trigger the new issuance of a firmware IO being submitted. This automatically will cause the parameter of FwIssuedIOCount to increase by 1.

Referring to FIG. 4 again, method 400 also includes step 410 for issuing a parameter of FwHeadPendPtr to indicate a new location of a first element in a local message index of a first IO in a list of pending IOs after the original first IO in the list of pending IOs is submitted to the firmware-dedicated queue. This step corresponds to the step 408 for reducing the parameter of FwPendingIOCount by 1 which indicates (the first) one IO in the list of pending IOs is submitted to the FW-dedicated queue. While the original second IO in the list of pending IOs becomes a new first IO in the list. The parameter FwHeadPendPtr is updated for indicating the new location of the first element in a local message index of the new first IO. At the same time, step 410 may include adjusting a parameter of FwTailPendPtr to indicate an optional change of the location of last entry in the local message index in the list of pending IOs if there is a new IO request is appended. The FwTailPendPtr may be the same, i.e., no adjustment, as the last IO in the list of pending IO operations remains the last IO.

In some embodiments, method 400 further includes configuring at least one submission queue as a firmware-dedicated queue for the firmware-issued IO operation and changing a parameter of FwQueueConfigured from 0 to 1 in the device state table. This configuration step can be done by the firmware of the controller during the discovery phase of each device. Changing the parameter of FwQueueConfigured to 1 indicates the configuration step is finished for this FW-dedicated queue. Method 400 may include enabling a firmware-dedicated queue for submitting only firmware-issued IO operation to a corresponding device linked to the virtual disks and setting a parameter of FwQueueEnable to 1, which makes the FW-dedicated queue ready to be used for handling FW-issued IOs if they are in the pending list. Alternatively, method 400 may include, if the parameter of FwPendingIOCount is 0, setting the parameter of FwQueueEnable to 0 to indicate that the firmware-dedicated queue is not used, and sharing the firmware-dedicated queue for handling IO operations.

Figure 5:
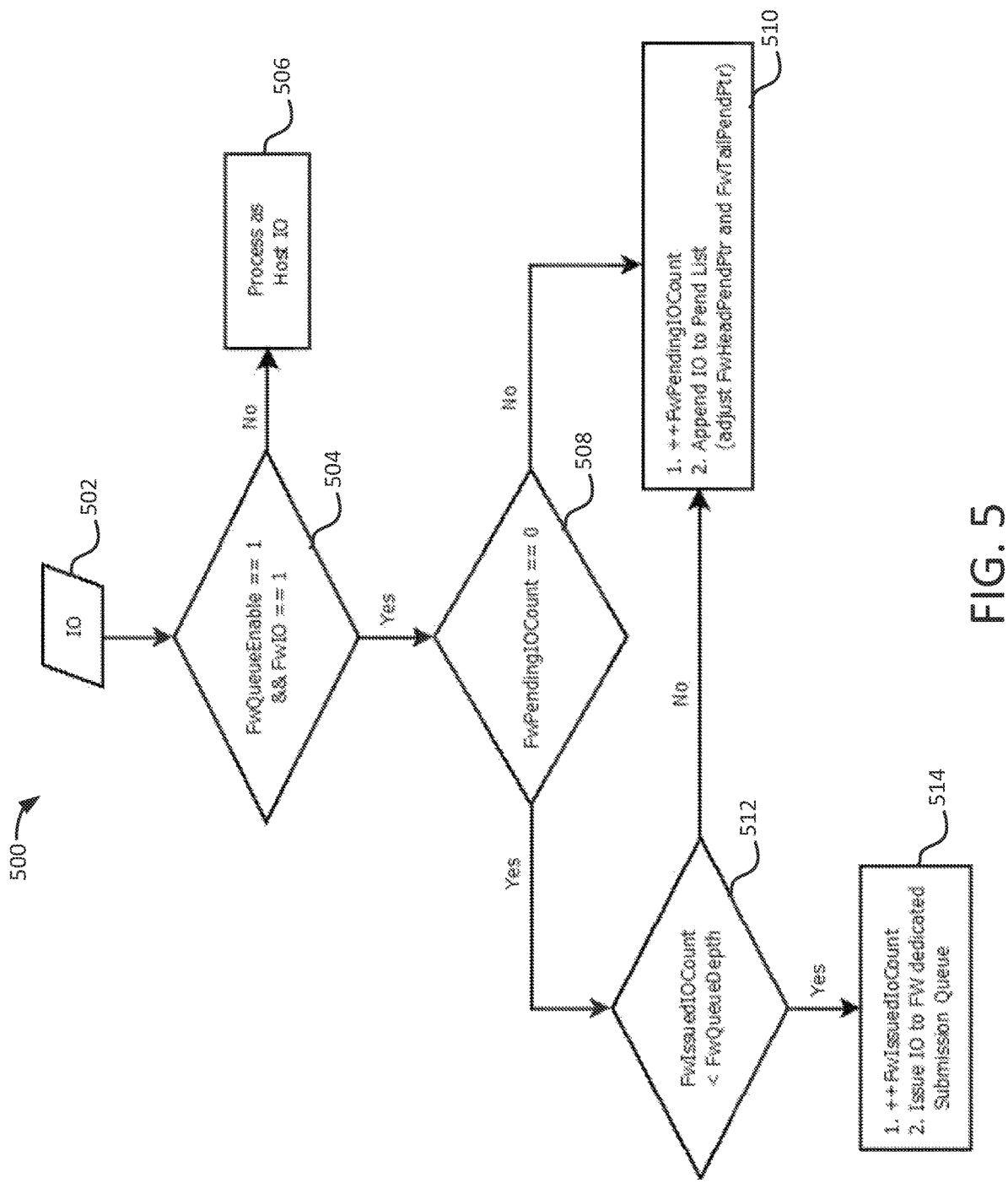
FIG. 5 is a flow chart illustrating a method for managing storage system input/output (IO) operations for devices linked to virtual disks via firmware-dedicated queues according to an embodiment of the subject technology.

FIG. 5 is a flow chart illustrating a method for managing storage system input/output (IO) operations for devices linked to virtual disks via firmware-dedicated queues according to an embodiment of the subject technology. In an alternative embodiment, method 500 includes step 502 for receiving an IO operation by a storage system controller. This IO may be initiated by a host for requesting the storage system controller (simply the controller) to handle operations to the devices like reading data from a disk drive into memory, writing data from memory to a disk drive, or transferring data across a network to or from the storage system. An IO initiated by a host is named a host IO. This IO may alternatively be initiated internally by the firmware of the controller to handle some background operations like rebuild, copyback, check-consistency, patrol-read etc. An IO initiated by the firmware is named a FW IO. So, there is a need for the controller to identify whether the received IO is a host IO or a FW IO.

Method 500 includes step 504 for checking whether a control bit FwIO==1 in a local message index (LMID) frame of the IO operation. The LMID frame associated with each IO includes a field of a byte used as a message flag. One bit in the message flag, i.e., FwIO, specifically is used to indicate whether an IO is a host IO or a FW IO. The firmware now can be configured to check the bit to identify the IO that the controller received at step 502. For example, FwIO=1 indicates the first IO is a FW IO and FwIO=0 indicates the IO is a host IO. At the same time, step 504 also performs checking a parameter of FwQueueEnable==1 in a controlled device state table of the storage system controller for a device linked to virtual disks. This parameter is used to indicate if a firmware-dedicated queue is in use or enabled to be used by the controller as a submission queue dedicated for firmware-initiated IO operations. This parameter is a first parameter added to the controller device state table (see FIG. 1) as disclosed in method 300 (see FIG. 3). If this parameter is found to be set to 1, the firmware of the controller can perform configuration of submission queues and completion queues during a device discovery phase, in which at least one queue is configured to be a dedicated submission queue for processing the first IO operation received by the controller.

Method 500 also includes step 506, under a condition that at least one of the two parameters, FwIO and FwQueueEnable, is confirmed not being set to 1, the controller would process the IO operation received at the step 502 as a host IO. For example, when the FwIO=0, then the IO is recognized as a host IO. When FwQueueEnable=0 irrespective that the FwIO is set to 1 or 0, it means the FW-dedicated queue is not in use, then the controller can use it to process the IO the same manner with the host IOs.

Referring to FIG. 5, method 500 also includes step 508 for, after both parameters are found being set to 1, further checking whether a parameter of FwPendingIOCount is equal to 0 in the controller device state table for the device. This parameter indicates a number of entries in a list of pending IO operations to be submitted via the FW-dedicated queue to the device. If the parameter of FwPendingIOCount is greater than 0, it means the list of pending IO operations has at least one firmware-issued IO pending to be submitted into the FW-dedicated queue. Method 500 then includes step 510 for increasing the parameter of FwPendingIOCount by 1 and appending the IO operation received at step 502 to an end of the list of pending IO operations to be issued by the firmware-dedicated queue to the device.

If the parameter of FwPendingIOCount is found to be 0 at step 508, method 500 would execute step 512 for additionally identifying that a total number of outstanding IO operations issued by the firmware (denoted by a parameter of FwIssuedIOCount) in the firmware-dedicated queue is smaller than a depth of the firmware-dedicated queue (denoted by a parameter of FwQueueDepth), indicating that the firmware-dedicated queue has an extra capacity to handle more firmware-issued IOs. Then, method 500 further includes step 514 for increasing the parameter of FwIssuedIOCount by 1 and issuing the IO operation received at step 502 directly to the firmware-dedicated queue. The firmware-dedicated queue may have been configured as a submission queue to submit (e.g., based on FIFO principle) the firmware-issued IO operations to the corresponding device.

Referring to FIG. 5 again, if the parameter of FwIssuedIOCount is found, in step 512, to be equal to or greater than the parameter of FwQueueDepth, meaning that the firmware-dedicated queue is full. Then, method 500 may execute the step 510 for increasing the parameter of FwPendingIOCount by 1 and appending the IO operation received at step 502 to the list of pending IO operations to be submitted to the firmware-dedicated queue. After this step, Method 500 may include another step for further adjusting a parameter of FwHeadPendPtr to indicate a location of a first element in the local message index in the list of pending IO operations if the device optionally completes execution of at least one IO operation in the firmware-dedicated queue and moves it out from the firmware-dedicated queue to a dedicated or shared completion queue. Then, at least one of the list of pending IOs, usually a first one, will be issued into the firmware-dedicated queue, which changes previous second IO operation in the list of pending IOs, following FIFO principle, to first IO in the list. Thus, the parameter FwHeadPendPtr in the controller device state table needs to be updated. At the same time because of the IO operation received at step 502 is appended as a last IO of the list of pending IOs, another step is executed for adjusting a parameter of FwTailPendPtr to indicate that the last entry in the local message index needs to be updated for the updated list of pending IO operations waiting to be submitted to the firmware-dedicated queue.

Method 500 for managing storage system input/output (IO) operations for each virtual disk via firmware-dedicated queues can be applied to any modern compute and storage systems especially for those with virtual disks (VDs) demanding high background maintenance overhead for achieving data redundancy and fault tolerance. In an embodiment, the storage system controller comprises a redundant array of independent disks (RAID) manager with firmware and hardware support for non-volatile memory express (NVMe) protocol. Method 500 applied in this controller may include a step of adding a user-configurable flag in a non-volatile memory of the controller to let user(s) to enable the firmware-dedicated queue from host applications. Method 500 may also include a step of configuring the firmware-dedicated queue as a dedicated submission queue and setting the parameter FwQueueEnable to 1 in the controller device state table for each device supporting the NVMe protocol.

In another embodiment, the storage system controller comprises a NVMe manager as a hardware unit or an interface to manage queues to each NVMe device. In this case, method 500 may include configuring and using the firmware-dedicated queue by the NVMe manager to submit the list of pending firmware IO operations to the firmware-dedicated queue if the parameter of FwQueueEnable is set to 1. Further, method 500 may include a step of sharing the firmware-dedicated queue by the NVMe manager for all IO operations if the FwQueueEnable is set to 0 (indicating the firmware-dedicated queue is not in use).

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for creating firmware-dedicated queues for storage system multi-queue operation comprising:
   providing a controller to manage a plurality of input/output (IO) operations between hosts and a virtual disk (VD) by issuing the plurality of IO operations to a plurality of queues comprising submission queues and completion queues, wherein one or more submission queues are mapped to each completion queue;
   configuring at least one submission queue as a FW-dedicated queue for submitting internal IO operations initiated by firmware (FW) associated with the controller and one completion queue shared with other IO operations; and
   adding one or more parameters in FW-queue-related fields in a controller device state table for each device in the VD, wherein the one or more parameters include at least a first parameter to enable the FW-dedicated queue for submitting the internal IO operations in parallel with other queues to the device.

2. The method of claim 1, further comprising toggling the first parameter from 0 to 1 to enable the FW-dedicated queues at runtime and using the FW-dedicated queues for submitting internal IO operations issued by the firmware only.

3. The method of claim 2, whereint he configuring comprises, if the first parameter is set to 1, configuring the submission queues and completion queues by the firmware during discovery of each device in the VD.

4. The method of claim 2, wherein the configuring comprises configuring the FW-dedicated queues by the firmware irrespective of the first parameter being toggled to 0 or 1 and setting a second parameter to 1 in the controller device state table to indicate the FW-dedicated queue being configured.

5. The method of claim 2, further comprising using the FW-dedicated queues by the storage system controller for any IO operations when the first parameter is set to 0 to indicate that the FW-dedicated queues are unused by the firmware.

6. The method of claim 1, further comprising identifying an IO operation to be a host IO operation or a firmware IO operation by an interface of the controller based on a message flag bit in a local message index (LMID) frame of the IO operation.

7. The method of claim 6, wherein the interface comprises a queue manager using non-volatile memory express (NVMe) protocol.

8. The method of claim 7, further comprising, when the first parameter is set to 1 for a device supporting the NVMe protocol, using the FW-dedicated queue to submit the firmware IO operation to the device, the FW-dedicated queue being serviced in parallel to other queues submitted to the same device.

9. The method of claim 1, further comprising adding a user-configurable flag to a non-volatile memory associated with the controller to let user enable or disable the FW-dedicated queue from host applications or from third-party utilities using application programming interfaces.

10. The method of claim 9, further comprising, once the user-configurable flag is set to enable the FW-dedicated queue, configuring the FW-dedicated queue as a submission queue and configuring a completion queue either as a dedicated queue or shared queue for a device in the VD supporting NVMe protocol during discovery phase of the device, and setting the first parameter to 1 in the controller device state table for the device supporting NVMe protocol.

11. The method of claim 1, wherein the adding one or more parameters in FW-queue-related fields further comprising adding a third parameter to indicate a total number of outstanding firmware IO operations being issued, a fourth parameter to indicate a location of a first element in local message index in a list of pending firmware IO operations to be processed, a fifth parameter to indicate a location of a last entry in local message index in a list of pending firmware IO operations to be processed, a sixth parameter to indicate queue depth of the FW-dedicated queue used as a submission queue, and a seventh parameter to indicate a total number of pending firmware IO operations to be submitted to the FW-dedicated queue.

12. A method for managing firmware-issued input/output (IO) operations via firmware-dedicated queues comprising:
   processing a firmware-issued IO operation submitted via a firmware-dedicated submission queue;
   placing a result of processing the firmware-issued IO operation to a completion queue;
   changing a parameter of FwIssuedIOCount in a device state table by a decrement of 1 to indicate that a number of outstanding firmware-issued IO operations is one less;
   identifying the parameter of FwIssuedIOCount to be smaller than a parameter of FwQueueDepth to indicate that a total number of the firmware-issued IO operations in the firmware-dedicated queue is smaller than a depth of the firmware-dedicated queue;
   identifying a parameter of FwPendingIOCount to be greater than 0 to indicate that at least one of firmware-issued IO operations is in a list of pending IO operations to be submitted;
   reducing the parameter of FwPendingIOCount by 1;
   increasing the parameter of FwIssuedIOCount by 1 by issuing a new IO operation to utilize the depth of the firmware-dedicated queue; and
   issuing a parameter of FwHeadPendPtr to indicate a new location of a first element in a local message index in a list of pending IO operations and adjusting a parameter of FwTailPendPtr to indicate a location of last entry in the local message index in the list of pending IO operations after a first firmware-issued IO in the list of pending IO operations is submitted to the firmware-dedicated queue.

13. The method of claim 12, comprising configuring at least one submission queue as a firmware-dedicated queue for the firmware-issued IO operation and changing a parameter of FwQueueConfigured from 0 to 1 in the device state table.

14. The method of claim 13, comprising enabling the firmware-dedicated queue for processing only firmware-issued IO operation and setting a parameter of FwQueueEnable to 1.

15. The method of claim 12, wherein, if the parameter of FwPendingIOCount is 0, setting the parameter of FwQueueEnable to 0 to indicate that the firmware-dedicated queue is not used, and sharing the firmware-dedicated queue with host IO operations.

16. A method for managing system input/output (IO) operations for a virtual disk via firmware-dedicated queues comprising:
receiving an IO operation by a controller;
checking whether a control bit FwIO is set to 0 or 1 in a local message index (LMID) frame of the IO operation and whether a parameter of FwQueueEnable is set to 0 or 1 in a device state table of the controller for each device linked to the virtual disk;
if at least one of FwIO and FwQueueEnable equals to 0, submitting the IO operation as a host IO operation;
else, if both FwIO and FwQueueEnable equal to 1 to indicate that the IO operation is a firmware IO and a submission queue is enabled to be a firmware-dedicated queue,
checking whether a parameter of FwPendingIOCount is greater than 0 or not in the device state table of the controller indicating a total number of a list of pending IO operations to be submitted to the firmware-dedicated queue;
if the parameter of FwPendingIOCount is greater than 0,
increasing the parameter of FwPendingIOCount by 1; and
appending the IO operation to the list of pending IO operations;
else, if FwPendingIOCount is queue equals to 0,
identifying that a parameter of FwIssuedIOCount representing a total number of outstanding IO operations issued by the firmware is smaller than a parameter of FwQueueDepth representing a depth of the firmware-dedicated queue;
increasing the parameter of FwIssuedIOCount by 1; and
issuing the IO operation to the firmware-dedicated queue.

17. The method of claim 16, further comprising, if the parameter of FwIssuedIOCount is equal to or greater than the parameter of FwQueueDepth, increasing the parameter of FwPendingIOCount by 1 and appending the IO operation to the list of pending IO operations.

18. The method of claim 17, further comprising: after increasing the parameter of FwPendingIOCount by 1,
adjusting a parameter of FwHeadPendPtr to indicate an updated location of a first element in the local message index in the list of pending IO operations; and
adjusting a parameter of FwTailPendPtr to indicate an updated last entry in the local message index in the list of pending IO operations.

19. The method of claim 16, comprising, wherein the controller comprises a redundant array of independent disks (RAID) manager with firmware and hardware support for non-volatile memory express (NVMe) protocol, adding a user-configurable flag in a non-volatile memory of the controller to let user from host applications to enable the firmware-dedicated queue, configuring the firmware-dedicated queue as a dedicated submission queue, and setting the FwQueueEnable to 1 in the device state table for each device supporting the NVMe protocol.

20. The method of claim 16, comprising, the controller comprises a NVMe manager as an interface to each NVMe device, configuring and using the firmware-dedicated queue as a submission queue for submitting the firmware IO by the NVMe manager if the FwQueueEnable is set to 1, and sharing the firmware-dedicated queue by the NVMe manager for all IO operations if the FwQueueEnable is set to 0.

* * * * *